United States Patent

Kuhlmann

[15] 3,653,029

[45] Mar. 28, 1972

[54] ANALOGUE TO DIGITAL CONVERTER

[72] Inventor: Joachim Kuhlmann, Heilbronn-Bockingen, Germany

[73] Assignee: Licentia, Patent-Verwaltungs-G.m.b.H., Frankfurt am Main, Germany

[22] Filed: Feb. 17, 1970

[21] Appl. No.: 12,013

[30] Foreign Application Priority Data

Feb. 22, 1969 Germany ......................P 19 09 032.5

[52] U.S. Cl. ........................................340/347 AD, 340/169
[51] Int. Cl. ........................................H03k 13/175
[58] Field of Search ..........................................340/347, 169

[56] References Cited

UNITED STATES PATENTS

| | | | |
|---|---|---|---|
| 2,869,079 | 1/1959 | Staffin et al. | 340/347 X |
| 2,896,198 | 7/1959 | Bennett | 340/347 |
| 2,922,151 | 1/1960 | Reiling | 340/347 |
| 2,974,315 | 3/1961 | Lebel et al. | 340/347 |
| 3,100,298 | 8/1963 | Fluhr | 340/347 |
| 3,216,005 | 11/1965 | Hoffman et al. | 340/347 |
| 3,298,014 | 1/1967 | Stephenson | 340/347 |
| 3,315,251 | 4/1967 | Kaneko | 340/347 |
| 3,425,054 | 1/1969 | Cowan | 340/347 |

*Primary Examiner*—Maynard R. Wilbur
*Assistant Examiner*—Charles D. Miller
*Attorney*—Spencer & Kaye

[57] ABSTRACT

An analogue-to-digital converter has an input for an analogue signal and a plurality of signal outputs each associated with a different voltage threshold, direct voltage signals being produced at a signal output when the analogue signal exceeds the associated voltage threshold, the threshold associated with at least one signal output being variable between upper and lower values in the same sense or direction as variations in amplitude of the analogue signal and being abruptly changed in the opposite sense between these values when the analogue signal reaches a predetermined intermediate value.

13 Claims, 7 Drawing Figures

Inventor:
Joachim Kuhlmann

Spencer & Kaye

BY ATTORNEYS.

Inventor:
Joachim Kuhlmann

BY Spencer & Kaye
ATTORNEYS.

Inventor:
Joachim Kuhlmann

BY Spencer & Kaye
ATTORNEYS.

ANALOGUE TO DIGITAL CONVERTER

BACKGROUND OF THE INVENTION

The invention relates to an analogue-to-digital converter with two or more signal outputs which respond to different threshold voltages and deliver direct-voltage signals as digital output signals when their threshold voltages are exceeded by the analogue input quantity.

The invention relates to a circuit which is of great importance in the digital circuit art. In accordance with its function it comprises one input for the analogue input quantity as well as at least two outputs at which direct-voltage signals are delivered. Depending on the specific construction of the analogue-to-digital converter, to which the present invention relates, either an output signal at a specific signal output is associated with each specific amplitude of the input signal, or, as is generally considerably more convenient, two or more outputs at a time deliver direct-voltage signals simultaneously, in which case a specific magnitude of the analogue input voltage is represented in each case by a specific combination of outputs carrying signals.

Now it is in the nature of digital data transmission that a separate digital output signal cannot be allocated to every possible amplitude of the analogue input quantity. Instead, the analogue input signal must first vary within a specific voltage range before this variation is represented by a variation in the digital output quantity. The values of the voltage at the input, at which a variation in the output signal takes place in each case, represent the above mentioned voltage thresholds.

SUMMARY OF THE INVENTION

According to the invention, there is provided an analogue-to-digital converter comprising an input for receiving an analogue signal, threshold means for producing a plurality of different voltage thresholds, a plurality of signal outputs each associated with one of said voltage thresholds, means for producing direct voltage signals as digital quantities at a signal output when the associated voltage threshold is exceeded by said analogue signal and means for varying the voltage threshold associated with at least one signal output between an upper and a lower value in the same sense as variations in the amplitude of said analogue signal and for abruptly changing said voltage threshold associated with at least one output between said two values and in the opposite sense to said variations in the amplitude of said analogue signal whenever the amplitude of said analogue signal reaches a predetermined value intermediate said two values.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
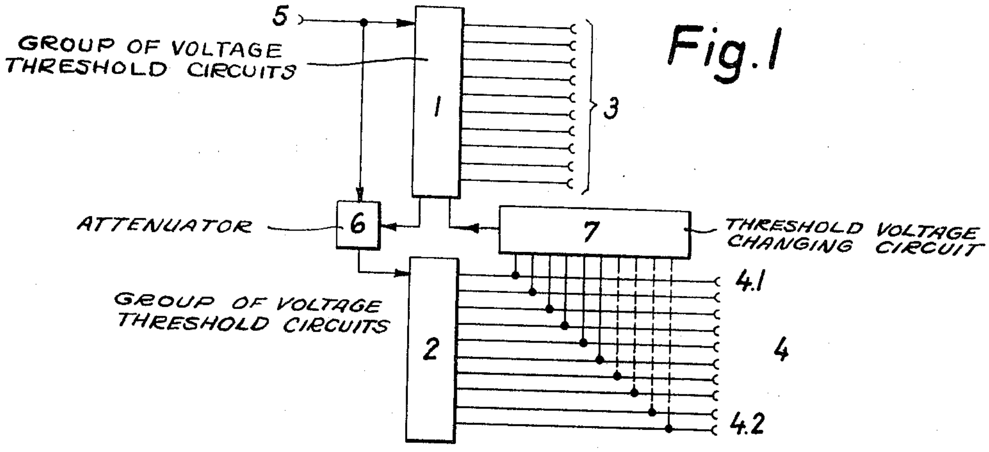
FIG. 1 is a block circuit diagram of an embodiment of the analogue-to-digital converter of the invention.

In an analogue-to-digital converter of the kind to which the invention relates, at least the voltage threshold associated with one output varies between an upper and a lower threshold value in the same sense or direction as the variation in amplitude in the analogue input quantity and the moment it is reached by the analogue input quantity it changes abruptly between the two threshold values counter to the behavior of the amplitude of said input quantity.

Thus, in the analogue-to-digital converter according to the present invention, on a rise in the amplitude of the analogue input quantity, the one voltage threshold at least is raised to the upper value. As will be shown from the description of specific embodiments of the invention, the voltage threshold may be raised step-by-step for example, to the upper threshold value, in accordance with the growth or rise of the analogue input quantity. Thus, in this case, the voltage threshold is displaced in staircase form towards high values. It is also possible, however, for the raising of the voltage threshold to be effected abruptly with the growth or rise of the analogue input quantity.

Regardless of the behavior in time of the variation in the threshold voltage, in every case the threshold voltage jumps from the upper to the lower threshold value counter to the behavior or direction of change of the amplitude of the analogue input voltage at the moment when the input voltage reaches the desired value of this voltage threshold. On the other hand, on a decrease in the amplitude of the analogue input quantity, the threshold voltage is deflected towards a lower threshold value, which may then again be effected intermittently or abruptly for example. When the analogue input quantity becomes equal to the desired value of the voltage threshold, this is again raised abruptly from the lower to the upper threshold value, counter to the behavior of the amplitude of the analogue input signal.

In the majority of cases, the analogue-to-digital converter according to the invention consists of at least two switching groups, which again are in turn each composed of at least two voltage comparison switching stages. The outputs of the switching stages form the outputs of the analogue-to-digital converter according to the invention. Apart from these outputs, each switch stage comprises two control inputs, to one of which there is applied the analogue input quantity and to the other of which there is applied a bias voltage determining the voltage threshold of the output in question. It is not, of course, necessary for the analogue input signal to be supplied to each switching stage in the same quantity. Thus it is perfectly conceivable, depending on the specific construction of the circuit, for example for the input signal to be first reduced or amplified by a specific factor for the control of the switching stages of one switching group, whereas it is supplied unaltered to the other switching group. Furthermore, it is perfectly possible for a specific amount of voltage to be first subtracted from the analogue input signal and then for the signal thus reduced to be passed on to a switching group.

The switching stages are so constructed and so connected to one another that a direct-voltage signal appears, in each case, at the output of that switching stage at which the difference in amplitude between the analogue input signal and the bias voltage increasing by a specific amount from one switching stage to the next is zero or substantially zero. In order to obtain an analogue-to-digital converter which permits as precise a reproduction as possible of the analogue input quantity by the digital output signal, with a relatively small number of switching stages, the two switching groups are coupled to one another in such a manner that each switching group delivers a direct-voltage signal at one output, that furthermore, as the analogue input quantity increases, the direct-voltage output signal first appears successively at one output after another in the first switching group, and then when it also disappears at the output of the switching stage to which the highest bias voltage is applied, on further increase in the analogue input quantity, it appears again at the output of the switching stage to which the lowest bias voltage is applied, and at the same time the output signal of the second switching group changes from one output to the output associated with the next higher bias voltage. It is understood, that, on the other hand, on a decrease in the amplitude of the analogue input quantity, the direct-voltage signal again appears successively on one output after another in the first switching group but in the reverse direction, in this embodiment of the invention, namely from the output associated with the highest bias voltage to the output associated with the lowest bias voltage. When the direct-voltage signal is also switched off by the output associated with the lowest bias voltage, on a further drop in the analogue input quantity, the direct voltage signal then again appears at the output of that switching stage to which the highest bias voltage is applied. The output signal is then simultaneously passed on from one output to that output with which there is associated the next lower bias voltage in the second switching group. In addition, in this specific example of the invention, means are provided for deriving an auxiliary signal from the low voltages at the signal outputs of the first switching group, which is used to vary the bias voltages of the second switching group between an upper and a lower value.

If each switching group comprises a plurality of switching stages, then in one switching group for example, some of these stages are connected by their outputs to the inputs of an AND gate and then the signal delivered by this AND gate is used as the auxiliary signal. In this case, the procedure may most conveniently be such that, from a specific switching stage on, all the following switching stages having a higher bias voltage are connected to the inputs of the AND gate, in which case, for example, half of all the switching stages in the first switching group are connected to the inputs of the AND gate.

The auxiliary signal appearing at the output of the AND gate has a pulselike behavior on variations in the analogue input quantity. It is therefore adapted to control the bias voltage of the second switching group in such a manner that these bias voltages, and hence also the voltage thresholds associated with this switching group, vary abruptly between the upper and lower value in the same sense as the variations in amplitude in the analogue input signal, as expressed above. Another method of obtaining the auxiliary signal consists in that each output of a switching group is connected, through a series resistor, to a load resistor which is common to all the switching stages thereof and at which the auxiliary signal then appears. The series resistors are then selected so that their resistance values decrease as the bias voltage of the switching stages increases. In this manner, it is possible to ensure that an auxiliary signal with a staircase-shaped curve is formed at the common load resistor upon variation in the amplitude of the input signals and the jumps in the direct-voltage signals associated therewith from one output to the next. The auxiliary signal thus obtained is then adapted to control the bias voltages of the second switching group in such a manner that these bias voltages, and also the voltage thresholds associated with the switching stages of the second switching group, vary in staircase form between an upper and a lower value in the same sense as the variations in amplitude in the analogue input quantity, as described above.

A voltage divider with a plurality of taps is provided, at least in parallel with the second switching group, in order to obtain the bias voltages. Each of these taps is connected to a switching stage so that the voltages appearing between the low end of the voltage divider and these taps are supplied to the various switching stages as bias voltages. The bias voltages are then varied by means of the auxiliary signal by means of a component which is included in the voltage divider and controlled by the auxiliary signal and which may be formed, for example, by a transistor. In order to keep the amounts by which the bias voltages vary equal for all the stages, this voltage divider may appropriately be so constructed that the voltages which appear between the taps are uninfluenced by the auxiliary signal and only the voltages between the taps and the low end of the voltage divider can be varied by the auxiliary signal. This can be achieved, for example, by the voltage divider being built up using zener diodes so that, between each of the taps, there is one zener diode at which there is then the drop in voltage by which the bias voltages increase from stage to stage. Another possibility consists in composing this voltage divider completely of resistors and then including a transistor between the low end of this purely ohmic voltage divider and the first tap. A constant direct-voltage signal may then be supplied as a control signal to this first transistor so that it ensures a constant flow of current through the voltage divider. In this manner, constant voltages appear at the resistors of the voltage divider and hence between the individual taps. The bias voltages delivered by this voltage divider to which a direct voltage is applied are varied in value by a second transistor which is connected in parallel with the part of this voltage divider which is not connected in parallel with any input of the switching group, and which then bridges to a greater or lesser extent this part of the voltage divider according to the value of the auxiliary signal supplied to its control electrode.

In another embodiment of the invention, the transistor connected between the low end of the voltage divider and its first tap is controlled by the auxiliary signal and in this manner varies the bias voltages delivered by the voltage divider. In this case, connected to the high end of the voltage divider is the output of a second transistor to which a constant control voltage is applied and which then delivers a constant current through the voltage divider so that constant voltages, uninfluenced by the auxiliary signal, appear at the resistors between the individual taps. It is a particular advantage, in the analogue-to-digital converter according to the invention, to ensure by circuit organization that the values assumed by the voltage thresholds or bias voltages after their abrupt variation counter to the variations in amplitude of the analogue input quantity are maintained at least until the output signals corresponding to the altered input quantity have become established.

Referring now to the drawings, FIG. 1 shows the block circuit diagram for a specific embodiment of the analogue-to-digital converter according to the invention. It consists of two switching groups 1 and 2, each of which comprises a plurality of outputs 3 and 4 respectively. The switching groups may consist, for example, of the switching stages described above, each having two inputs, to one of which there is applied a bias voltage which increases by a specific amount from one switching stage to the next, and to the other of which there is applied the analogue input quantity supplied to the input terminal 5 of the circuit illustrated. In the construction selected, the analogue input signal passes direct to the input of the switching group 1 whereas it is supplied to the switching group 2 through the portion 6 of the circuit. The switching groups 1 and 2 are so constructed that each switching group delivers a direct-voltage signal at one output and, on an increase in the amplitude of the analogue input quantity for example, the direct-voltage output signal is at first passed on from output to output in the switching group 2, i.e., it appears successively on one output after another. When the topmost output 4.1 is reached, with which the highest bias voltage should also be associated, then, on further increase in the analogue input quantity, the output signal jumps to the lower output 4.2 of this switching group with which there is associated the lowest reference voltage. At the same time, the output signal is passed on, in the switching group 1, from one output to the adjacent output with which there is associated a higher bias voltage. On a drop in the analogue input quantity, the operations take place in the reverse direction. The output signal will first change, in the switching stage 2, from the upper output 4.1 to the lower output 4.2. Then, on a further drop in the analogue input quantity, the signal change takes places from the output 4.2 to the output 4.1 with simultaneous change of the signal in the switching group 1 from one output to the adjacent output with which there is associated a lower bias voltage.

In order that the jumping of the output signals in the switching group 1 may take place at the correct moment, in one example of an embodiment of the invention the amount by which the voltages in this switching group increase from one switching stage to the next is selected so great that, in order to vary by this amount, the input signal must rise or fall at least to such an extent that all the outputs of the switching group 2 have delivered direct-voltage signals in succession. In another example of an embodiment of the invention, the changing over of the signals at the outputs of the switching group 1 at the correct moment is ensured by the fact that although the two switching groups 1 and 2 are identical in construction and have the same bias voltages applied to them, nevertheless the analogue input signal is supplied to the switching group 1 after it has been reduced in amplitude by a voltage divider. The factor by which the analogue input signal is reduced by this voltage divider is selected so that the input signal must again rise or fall to such an extent that all the outputs of the switching group 2 have delivered signals in succession in order that the reduced input voltage supplied to the switching group 1 may vary by the amount of voltage by which the bias voltages for this switching group differ from one switching stage to the next.

The direct switching over of the signal between the lower and upper output 4.1 or 4.2 respectively of the switching group 2, on a signal change in the switching group 1, is effected by means of a signal which is delivered by this switching group and by means of which, in the circuit section 6, the analogue input quantity is reduced or increased by an amount of voltage which corresponds to the difference between the highest and the lowest bias voltage in the first switching stage, on every change of the direct-voltage signal from one output of the switching group 1 to an adjacent output having a higher or lower bias voltage.

As FIG. 1 shows, at least some of the outputs of the switching group 2 are connected to the circuit portion 7. The broken lines leading to the circuit section 7 are intended to indicate that not all the outputs of the switching group 2 have to be connected to the circuit section 7. Depending on the signals at these outputs and also depending on the variations in the analogue input quantity the circuit section 7 now produces an auxiliary signal which is supplied to the switching group 1 and there produces the variations in the bias voltages distinguishing the analogue-to-digital converter according to the invention.

Figure 2A:
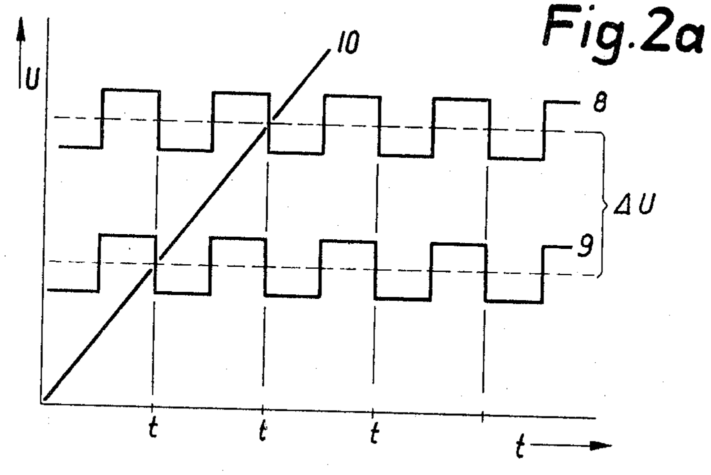
FIGS. 2*a* and 2*b* are geographical diagrams showing the behavior of the bias voltages in two adjacent switching stages of the first switching group shown in FIG. 1, in accordance with two auxiliary signal arrangements.
Figure 2B:
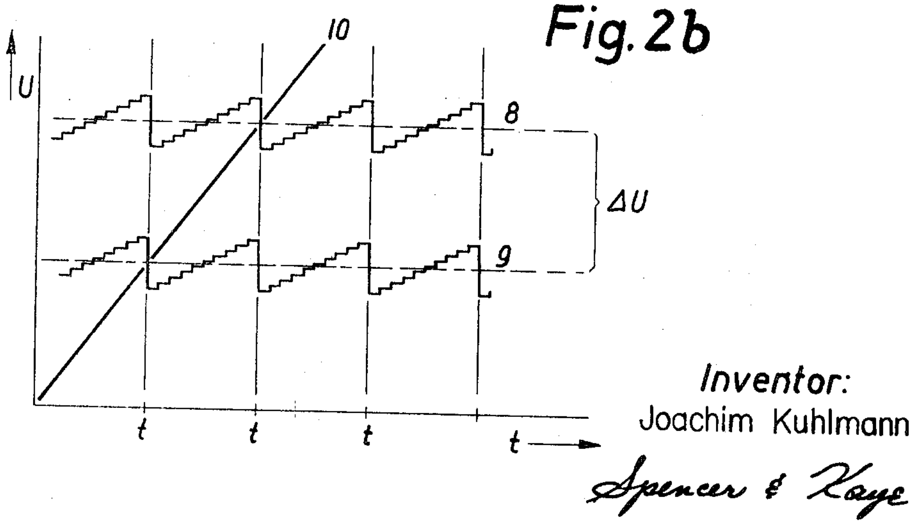

The behavior of the bias voltages 8 and 9 in time for two adjacent switching stages in the switching group 1 is illustrated in FIGS. 2a and 2b. In addition, a gradually increasing voltage 10, which is intended to represent the analogue input quantity, is plotted in both Figures. For FIG. 2a, it has been assumed that the bias voltages 8 and 9 vary rectangularly, whereas in FIG. 2b they vary in staircase form between their upper and lower value. The desired values of the bias voltages are given in broken lines in both Figures. The value of the voltage by which the bias voltages 8 and 9 differ from one another is designated by Δ. In both Figures, an increase in the bias voltage from its lower value to the upper value takes place in the same sense as the increase in the analogue input quantity, in the interval of time between the moments t. At the moment t, at which the magnitude of the input voltage reaches the desired value of one of the bias voltage 8 and 9 in each case, the bias voltages then jump in the opposite direction from their upper to their lower value and then, on a further rise in the voltage 10, again tend abruptly or in staircase form towards the upper value. The conditions which occur in the event of a decrease in the input voltage 10 can likewise be derived from Figures 2*a* and 2*b*, namely by reversing the direction of the time axis. In this case, the bias voltages decrease in the same sense as the input voltage 10 in the period between the moments *t* and vary abruptly, and counter to the voltage *c*, between their lower and upper value at the moment *t* in each case.

Figure 3:
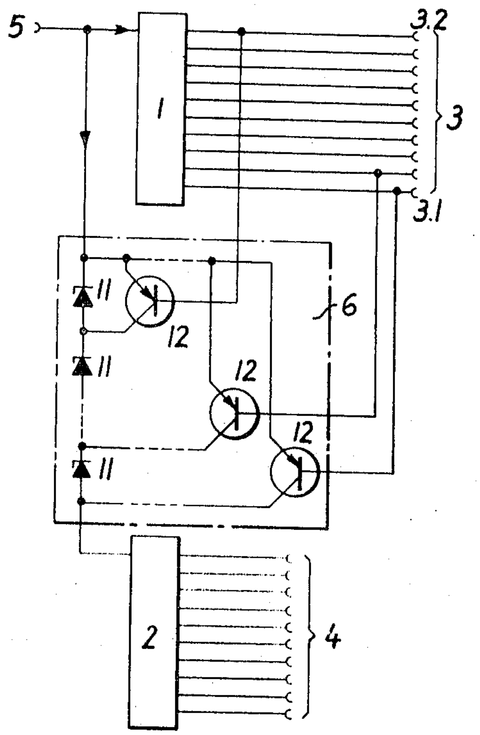
FIG. 3 is a block circuit diagram of the embodiment of FIG. 1 but showing a portion of the circuit in greater detail.

FIG. 3 again shows a simplified block circuit diagram of the analogue-to-digital converter according to the invention such has been described in connection with FIG. 1, but in this FIG. 3, the circuit section 6 is represented in detail. The circuit cation 6 which, as described, reduces the input signal supplied to the switching group 2 by a specific voltage value depending on the switching state of the switching group 1, that is to say depending on which of the outputs 3 in this switching group happens to be carrying a signal, consists essentially of a plurality of zener diodes connected in series. The number of zener diodes is equal to the number of signal outputs 3 in the switching group 1. It should be pointed out, however, that other circuits or components suitable as a constant current source may be provided instead of the zener diodes and are then mounted in front of the input of the switching stage 2 in such a manner that the direct voltages supplied thereby can be subtracted from the analogue input signal. Transistors 12 are mounted in parallel with the zener diodes in such a manner that a greater or smaller number of these zener diodes is bridged by the transistors 12 connected by their base connections to the outputs 3 of the switching group 1, depending on the switching state of the switching group 1. Each of these transistors 12 is then in the conducting state when the output 3 associated therewith is carrying a direct-voltage signal because of the amplitude of the analogue input signal. As can be seen from FIG. 3, all the zener diodes are bridged by the conducting collector-to-emitter path of a transistor 12 when there is a direct-voltage signal at the lowest output 3.1, with which the lowest bias voltage should also be associated. When the output signals changes from one output 3 to the adjacent output 3 having the next higher bias voltage, as the amplitude of the analogue input signal rises, then at each change, the number of zener diodes connected in series in front of the input of the switching group 2 rises by one such diode until finally all the diodes are connected in series in front of the input of the switching group 2 when the output signal again disappears even from the uppermost output 3.2 with which the highest bias voltage should be associated, as a result of the increasing analogue input voltage.

Figure 4:
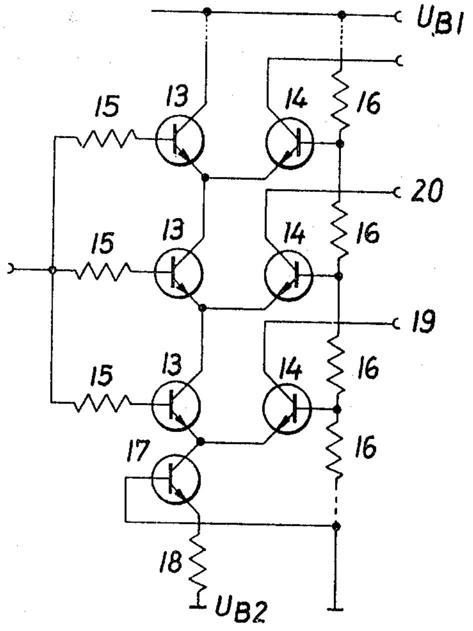
FIG. 4 illustrates a practical example of a switching group suitable for use in the circuit of FIGS. 1 and 3.

FIG. 4 illustrates the practical embodiment of a switching group which is suitable, in an advantageous manner, for use in the analogue-to-digital converter according to the invention. In the switching group illustrated, each comparison switching stage is formed by a differential amplifier which is composed of the transistors 13 and 14. The comparison stages are connected in parallel between the input and output of the switching group. The analogue input quantity is supplied to the control electrodes of the transistors 13, through decoupling resistors 15, while bias voltages determining the voltage threshold are applied to the transistors 14, at their control electrodes. These bias voltages are supplied by a voltage divider which is composed of the resistors 16 and which is connected in parallel with the switching group shown. For the sake of clarity, the number of differential amplifiers acting as switching stages has been restricted to three but may, of course, be selected considerably higher according to the applications. Connected in series with the transistors 13 of the differential amplifiers which transistors are connected in cascade across the supply voltage is a transistor 17 to which there is applied a constant bias voltage and which delivers a constant current to the differential amplifiers and comprises a resistor 18 in its emitter circuit to stabilize the working point. The current delivered by the transistor 17 produces the transient voltages representing the analogue input signal at the load resistors connected into the output circuits of the differential amplifiers. The voltages $U_{B1}$ and $U_{B2}$ are provided for the voltage supply and are both related to earth potential to which the base of the transistor 17 is also connected. The mode of operation of the circuit shown can be explained as follows.

A fixed bias voltage appears at each of the transistors 14 through the voltage divider composed of the resistor 16 and increases, from differential amplifier to differential amplifier, by the amount of voltage dropping at each of the voltage-divider resistors 16. If, for example, the analogue input signal supplied to the transistors 13 is lower in amplitude than the bias voltage which appears at the transistor 14 of the first differential amplifier connected directly to the transistor 17, then the transistor 14 of this amplifier is conducting while the transistor 13 is in the cutoff state. The current signal delivered by the transistor 17 passes through the transistor 14 to the output 19 and produces a direct-voltage signal at the load resistor connected at this output. If, on the other hand, the amplitude of the analogue input quantity is above that of the bias voltage supplied to the first differential amplifier, then the transistor 14 of this amplifier is cut off while the transistor 13 is in the conducting state. The current delivered by the transistor 17 then flows across this conducting transistor 13 so the second differential amplifier connected in series with the first. The same conditions also apply at this as at the first differential amplifier. If the amplitude of the analogue input signal is lower than the bias voltage, then the transistor 14 is conducting and the current reaches the output 20. If the amplitude of the analogue input signal is above the bias voltage, however, then the transistor 13 is again conducting and the current delivered by the transistor 17 is passed on through it to the third differential amplifier. In this, the comparison between the bias voltage and the analogue input voltage, and the control of the transistors 13 and 14 as described, is again effected. Attention may also be drawn to the fact that the switching group illustrated generally requires some supplementing when used in an analogue-to-digital converter according to the present invention. Thus, in particular, the number of switching stages for example may be increased considerably in comparison with the circuit shown in FIG. 4. In addition, in the circuit which is to assume the function of the switching group designated by the numeral "1" in FIGS. 1 and 2, the above-mentioned transistors are provided in the voltage divider composed of the resistors 16 and then permit the variation in the bias voltages of this switching group depending on the analogue input quantity.

Figure 5:
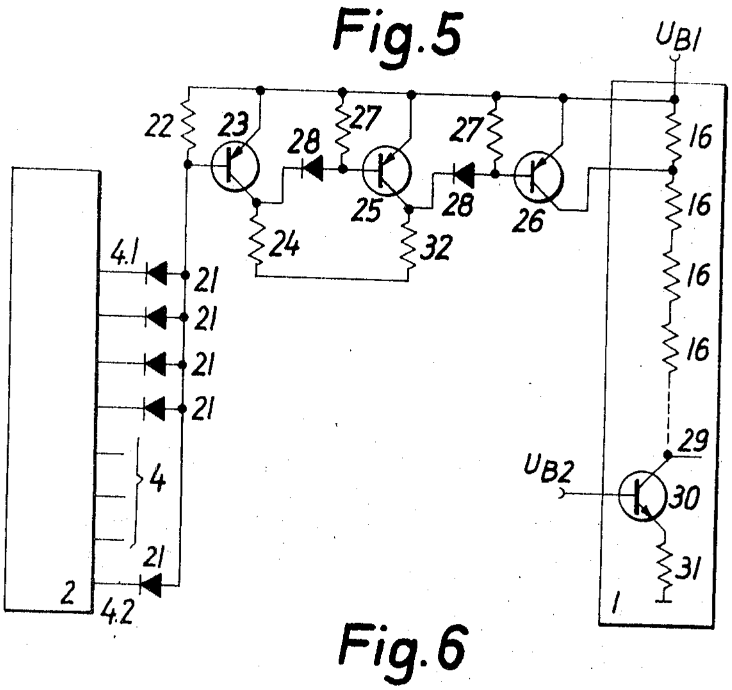
FIG. 5 illustrates one arrangement for deriving the auxiliary signal for controlling the bias voltages as shown in FIGS. 2a, and FIG. 6 illustrates an arrangement for deriving the auxiliary signal for controlling the bias voltages as shown in FIG. 2b.
Figure 6:
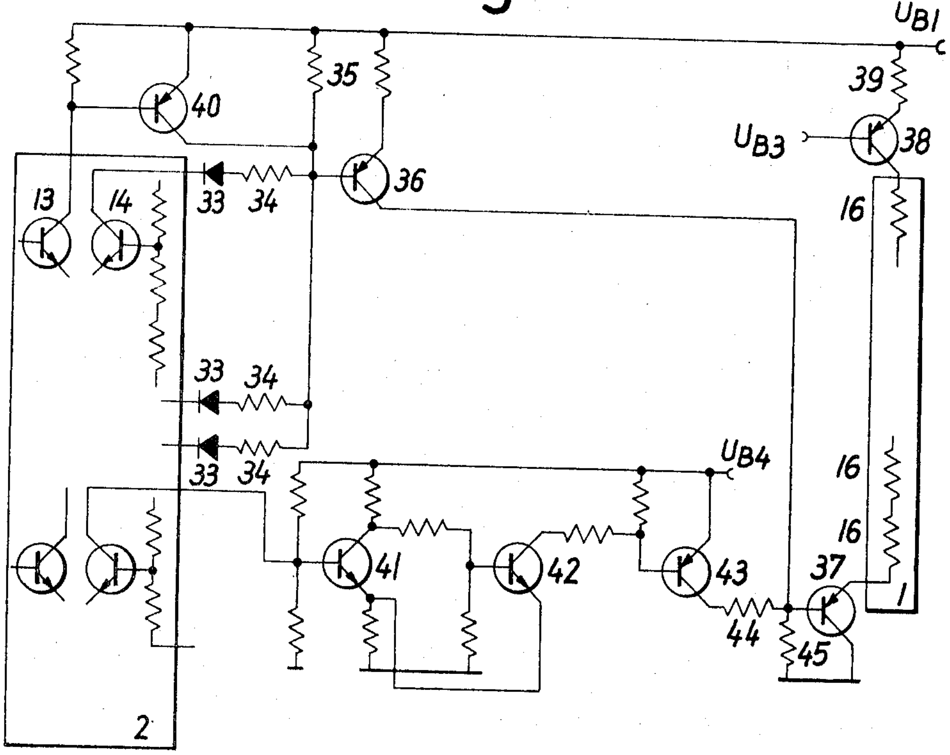

In FIGS. 5 and 6, two possible embodiments are illustrated for the circuit section 7 which delivers the auxiliary signal of varying bias voltages to the switching group 1. In addition, in both of the circuits shown, means are provided whereby the values which the bias voltages have after their abrupt variation counter to the behavior of the amplitude of the analogue input quantity are retained, at least until the output signals corresponding to the altered input quantity have become established.

In the circuit illustrated in FIG. 5, some of the outputs 4 of the switching group 2 are connected, through diodes 21, to a common load resistor 22. Here again, the highest bias voltage is associated with the output 4.1 and the lowest bias voltage in this switching group with the output 4.2. A distinctive feature of this circuit is that, from a specific output 4 on, all the outputs, with which higher bias voltages are associated, are connected to the load resistor 22, and that, in addition, the output 4.2, with which the lowest bias voltage is associated, is likewise connected to the load resistor 22 through a diode 21. The diodes 21, together with the resistor 22, form an AND gate which has a plurality of inputs and which always delivers an output signal when one of these inputs has an input signal.

Connected in parallel with the resistor 22 is the emitter-base path of a transistors 23 which has a load resistor 24 in its collector circuit. Following on the transistor 23 are two amplifier stages which are composed of the transistors 25 and 26 and each of which has a separate resistor 27 connected in parallel with the base-to-emitter path and a separate diode 28 connected in series with its base. The base connections of the transistors 25 and 26 are each connected to the output of a preceding stage through these diodes. The transistor 25 is provided with a load resistor 32 in its collector circuit while the collector-to-emitter path of the transistor 26 bridges part of the voltage divider which is composed of the resistors 16 and which delivers the bias voltages for the switching stages of the switching group 1.

If one of the outputs 4 connected to the AND gate now carries a direct-voltage signal, the transistor 23 is driven and the transistor 25 is cut off. With the transistor 25 cut off, the transistor 26 is in turn conducting and the resistor 16 of the voltage divider is then short-circuited through its collector-to-emitter path. On the other hand, if none of the outputs 4 connected to the AND gate is carrying a direct-voltage signal, the transistor 26 is cut off and the resistor 16 connected in parallel thereto is effective. In this manner, the bias voltages delivered by the voltage divider are varied between a lower and an upper value depending on the switching stage of the transistor 26. Between the low end of the voltage divider, which at the same time corresponds to earth potential, and the first tap 29, there is provided a transistor 30 which has an emitter resistor to stablise the working point. A constant direct voltage $U_{B2}$ is applied to this transistor 30. This transistor then delivers a constant current through the voltage divider so that voltages which are independent of the particular switching state of the transistor 26 drop at the resistors 16. In this manner, the variations in the voltages between the collector of the transistor 30 and earth potential, which occur on switching of the transistor 26 between the cutoff and conducting state, are superimposed, in equal magnitude, on all the bias voltages taken off from the voltage divider.

By suitable selection of the resistors 27 as well as of the resistors 24 and 32 respectively connected into the collectors circuits of the transistors 23 and 25, it is possible to ensure that, on a variation in the signal appearing at the resistor 22, overdriving of one of the two transistors 25 and 26 occurs and in this manner the switching stage of the transistor 26 which has become established is retained for a certain time, independently of the signals at the outputs 4, namely until, after the signal change at the outputs of the switching group 1 caused by the variation in the analogue input quantity, the output signal of the switching group 2 has also become reestablished in accordance with the changed analogue input voltage.

In the circuit shown in FIG. 6, all the outputs 4 of the switching group 2, with the exception of the output 4.2 with which the lowest bias voltage is associated, are connected, through diodes 33 and series resistors 34, to a common load resistor 35. The resistance values of the resistors 34 may be so selected, for example, that they increase gradually from the outputs with which the low bias voltages are associated towards the outputs with which high bias voltages are associated.

The auxiliary signal appearing at the resistor 35 serves to control the transistor 26, the collector of which is connected to the base of the transistor 37 which has its emitter-collector path included in the voltage divider delivering the bias voltages for the switching group 1 at the low side of the voltage divider. The high end of this voltage divider composed of the resistors 16 is connected to the collector of a transistor 38, which has an emitter resistor 39 to stabilize the working point and is subjected to a constant bias voltage $V_{B3}$, and hence delivers a constant current to the voltage divider.

Whereas, in the analogue-to-digital converter according to the present invention shown in FIG. 5, the bias voltages in the switching group 1 vary abruptly as a result of the abrupt behavior of the auxiliary signal at the resistor 22, as illustrated in FIG. 2a for example, the auxiliary signal appearing across the resistor 35 of the circuit has a staircase form on variation in the analogue input quantity, and this then leads to the behavior in time shown in FIG. 2*b* for the variations in bias voltage in the switching group 1.

In the example of an embodiment of the analogue-to-digital converter according to the invention shown in FIG. 6, the switching group 2 at least consists, as indicated in this Figure, of the differential amplifiers which are connected in cascade and which were described in connection with FIG. 4. The collectors of the transistors 14 form the outputs 4 of this switching group. The collector of the transistor 13 of the differential amplifier to which the highest bias voltage is applied, is connected to the base of a transistor 40, the collector-to-emitter path of which is connected in parallel with the resistor 35. Now at the moment when, with a raising analogue input signal, the direct-voltage signal disappears from the output of the uppermost differential amplifier, the transistor 13 of this amplifier becomes conducting. Along with the transistor 13, the transistor 40 also changes over into the conducting state and short-circuits the resistors 35 with its conducting collector-to-emitter path so that the auxiliary signal appearing across the resistor 35 has a zero value. Now it is possible to design the circuit so that, when the transistor 13 associated with the highest bias voltage is conducting, the transistor 40 is overdriven so that its cutoff delay is greater than the time which is needed for the signals at the outputs of the switching groups 1 and 2 to be able to become reestablished according to the changed analogue input voltage.

The output of the differential amplifier associated with the lowest bias voltage is connected to the input of a Schmitt trigger which is composed of the transistors 41 and 42 and the associated resistors. Connected to the output of this Schmitt trigger is an amplifying transistor 43 which is connected, by its collector, through a resistor 44, to the base of the transistor 37.

Now at the moment when, for an appropriate quantity of the analogue input signal, the switching stage of the switching group 2 associated with the lowest bias voltage also delivers a direct-voltage signal, the Schmitt trigger drives the transistor 43. A direct voltage, by means of which the transistor 43 is cut off, then becomes established at the base of the transistor 37 through the voltage divider composed of the resistors 44 and 45, so that the bias voltages which are delivered by the voltage divider composed of the resistors 16 assume their upper value.

Finally, attention may also be drawn to the fact that in the analogue-to-digital converters according to the invention as shown in FIGS. 5 and 6, the two switching groups 1 and 2 are constructed in such a manner, and above all the bias voltages of these switching groups are selected in such a manner, that the signal change at the outputs 3 of the switching group 1 always takes place when, as the input signal rises, the direct-voltage signal already appearing at the output 4.1 of the switching group 2 associated with the highest bias voltage again disappears from this output, or when, with a falling input signal, the direct-voltage signal in the switching group 2 jumps from the output associated with the second lowest bias voltage to the output to which the lowest bias voltage is applied.

It will be understood that the above description of the present invention is susceptible to various modifications, changes and adaptations.

What is claimed is:

1. An analogue-to-digital converter comprising: an input for receiving an analogue signal, first and second groups of comparison switching stages, each group including a plurality of switching stages connected in parallel, an output for each said stage which outputs form the digital signal outputs of said converter, a first control input for each said stage to which said analogue signal is applied, a second control input for each said stage to which a bias voltage determining the comparison voltage threshold of the respective stage is applied, the bias voltages in each group for each stage being greater than the bias voltage of each preceding stage in said group, means for producing a direct-voltage signal at the output of a switching stage when the difference in amplitude between said analogue signal and the said bias voltage of such stage is zero or at least substantially equal to zero, and means for causing the direct-voltage signal delivered at the outputs of said first switching group to be present successively on one output after another as said analogue signal increases, means for causing said direct voltage signal of said first switching group which is present on the output of the switching stage of said first switching group with which the highest bias voltage is associated to disappear and to cause a direct voltage signal output from the switching stage of said first switching group associated with the lowest bias voltage as said analogue signal increases further in amplitude, and at the same time causing the direct-voltage signal output in said second switching group to appear at the output associated with the next higher bias voltages, means for deriving an auxiliary signal from the direct voltages at the signal outputs of said first switching group, and means responsive to said auxiliary signal for varying the bias voltages of said second switching group between upper and lower values in the same direction as the direction of variation in the amplitude of said analogue signal and for abruptly switching said bias voltages of said second switching group between said upper and lower bias values and in the opposite direction to the direction of said variation in the amplitude of said analogue signal whenever the amplitude of said analogue signal reaches a predetermined value intermediate said two bias values for a respective switching stage of said second switching group.

2. An analogue-to-digital converter as defined in claim 1, wherein said means for deriving said auxiliary signal includes an AND gate to which some of the outputs of said switching stages of said first switching group are connected.

3. An analogue-to-digital converter as defined in claim 1, wherein said means for deriving said auxiliary signal includes an AND gate to which the output of a specific switching stage in said first switching group and the outputs of all the following switching stages in said first switching group associated with higher bias voltages than said specific switching stage are connected.

4. An analogue-to-digital converter as defined in claim 3, further comprising means for connecting the output of the switching stage of said first switching group to which the lowest bias voltage is applied to an input of said AND gate.

5. An analogue-to-digital converter as defined in claim 1, wherein said means for deriving said auxiliary signal includes an AND gate to which the outputs of substantially that half of the switching stages in said first switching group which are associated with the higher bias voltages are connected.

6. An analogue-to-digital converter as defined in claim 1, wherein said means for deriving said auxiliary signal includes a common load resistor to which the outputs of the switching stages of said first switching group are each connected, a series resistor between each said output and said common load resistor, the resistance values of said series resistors decreasing from output to output with increasing associated bias voltage, and means for taking off said signal at said common load resistor.

7. An analogue-to-digital converter as defined in claim 6, wherein said means for deriving said auxiliary signal further includes a transistor, connected in parallel with said common load resistor, for short circuiting said common load resistor as a result of being overdriven when the highest bias voltage is exceeded by the analogue signal voltage appearing at the inputs of the first switching group.

8. An analogue-to-digital converter as defined in claim 1, further comprising a voltage divider connected in parallel with said second switching group, a plurality of taps in said voltage divider, each connected to a switching stage of said second switching group for supplying the voltages appearing between the low end of said voltage divider and said taps as bias voltage to said switching stages of said second switching group; and said means for varying the bias voltages comprises a controllable component in said voltage divider and controlled by said auxiliary signal for varying the voltages between said low end of said voltage divider and said taps but leaving the voltages between said taps uninfluenced by said auxiliary signal.

9. An analogue-to-digital converter as defined in claim 7, wherein said controllable component is a transistor.

10. An analogue-to-digital converter as defined in claim 1, further comprising an ohmic voltage divider connected in parallel with said second switching group, a plurality of taps in said ohmic voltage divider, each connected to a switching stage of said second switching group for supplying the voltage appearing between the low end of said ohmic voltage divider and said taps as bias voltage to said switching stages of said second switching groups; and wherein said means for varying the bias voltages comprises a transistor connected between said low end and the first adjacent tap of said ohmic voltage divider for delivering a constant current through said ohmic voltage divider and a second transistor, controlled by said auxiliary signal and connected to parallel with that portion of said ohmic voltage divider which is not connected in parallel with any output of a switching stage, for varying the magnitude of the bias voltage delivered by said ohmic voltage divider.

11. An analogue-to-digital converter as defined in claim 1, further comprising an ohmic voltage divider connected in parallel with said second switching group, a plurality of taps in said ohmic voltage divider, each connected to a switching stage of said second switching group for supplying the voltages appearing between the low end of said ohmic voltage divider and said taps as bias voltage to said switching stages of said second switching groups; and wherein said means for varying the bias voltages comprises a transistor controlled by said auxiliary signal and connected in said ohmic voltage divider between the low end and the first adjacent taps of said ohmic voltage divider for varying the magnitude of the bias voltage delivered by said ohmic voltage divider and a second transistor having an output connected to the high end of said ohmic voltage divider for delivering a constant current through said ohmic voltage divider.

12. An analogue-to-digital converter as defined in claim 11, further comprising means for retaining the voltage values which the voltage thresholds or bias voltages assume after their abrupt changes counter to the variations in amplitude in the analogue input signal, at least until the output signals corresponding to the altered input signal have become established.

13. An analogue-to-digital converter as defined in claim 12, wherein said means for varying the bias voltages further includes a Schmitt trigger, the input for said Schmitt trigger being connected to the output of said first switching group associated with the lowest bis voltages and the output for said Schmitt trigger being connected to the control electrode of said transistor which is connected to the low end of said ohmic voltage divider, said output of said Schmitt trigger, on a direct-voltage signal at the output of said first switching group associated with the lowest bias voltage, providing a signal which causes raising of the bias voltages of said second switching group to their upper value.

* * * * *